3,365,339
INDURATING ORE FINES PELLETS
Donald Beggs, Toledo, Ohio, and William A. Ahrendt, Lambertville, Mich., assignors to Midland-Ross Corporation, Toledo, Ohio, a corporation of Ohio
Filed Aug. 16, 1965, Ser. No. 480,076
13 Claims. (Cl. 75—3)

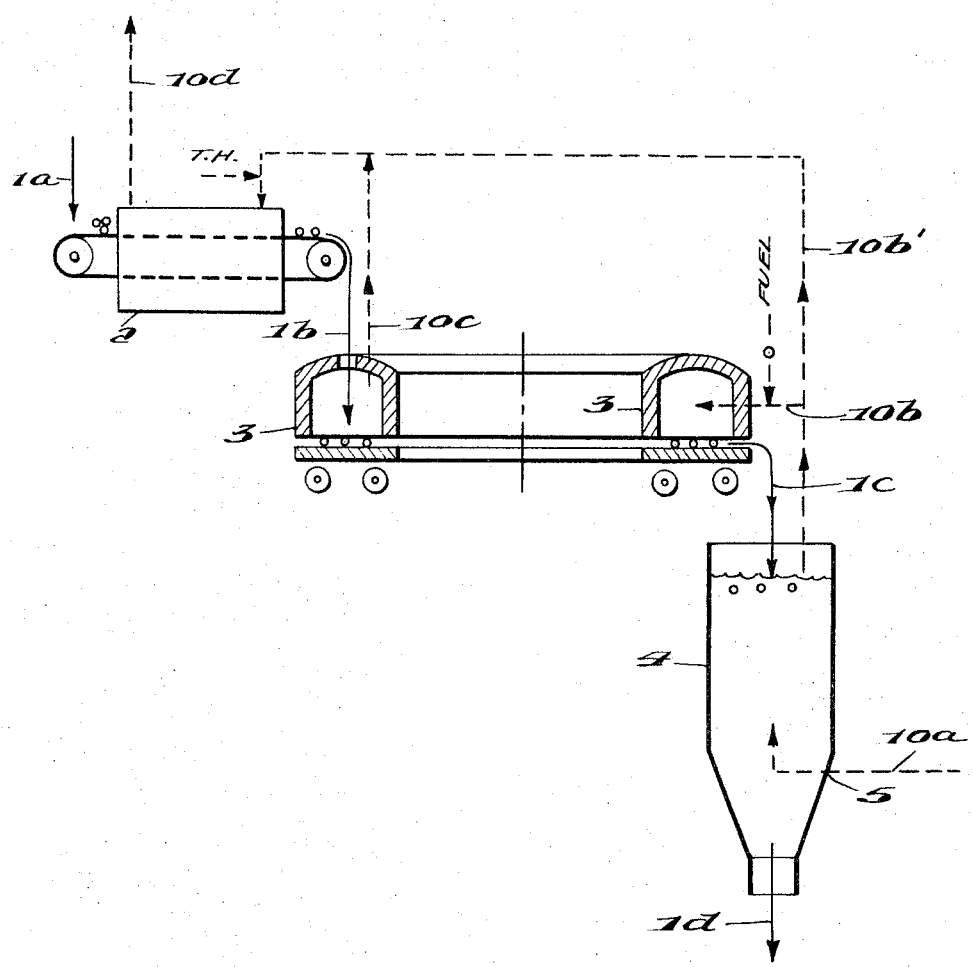

This invention relates to the art of agglomerating finely divided mineral solids, e.g., the products obtained in beneficiating ores, more particularly, iron ores, and is concerned with improvements in the processing of the finely divided beneficiation products, i.e., "concentrates," to the formation therefrom of masses—e.g., small spherical or spheroidal bodies or "pellets"—having desirable sizes. The invention will, in the following, be described with specific reference to the induration (called in the industry "pelletizing") of initially moist "green" balls or glomerules, formed of iron ore concentrates to the production of discrete spherical or spheroidal bodies ("pellets") having a hardness and a resistance to shock and to abrasion akin to that of the rock-like ores from which the concentrates had been derived. In the industry, the combined balling and induration procedure is usually referred to as "pelletizing" the concentrates. The present invention is not specifically concerned with the balling aspect of the pelletizing operation—other than that the green balls starting material, however formed, shall have a reasonable "wet strength"—but is concerned with drying and indurating the initially moist "green" balls.

The over-all operation of converting an initially moist green ball into an indurated pellet involves the following sequence of steps: The green ball, which contains a significant amount of moisture, is first dehydrated to the bone-dry state by heating, and then is progressively heated—conventionally, in an oxidizing atmosphere—to a final temperature sufficiently elevated to cause adhesion of particle to particle, and substantial grain growth between adjacent particles. One mode of carrying out this operation, which has accounted for the production of many millions of tons of indurated pellets, is as follows: The moist green balls are carefully laid down on the stockline of a column of balls similar to the green balls save for differences in moisture contents and possibly for differences in state of oxidation, which column gravitationally descends through a generally vertical shaft-type indurating furnace. The upper portion of the column is traversed by countercurrent streams of a heating gas (conventionally, air plus high temperature gaseous products of combustion), to the development in the column of a roughly horizontally disposed zone of maximum temperature (i.e., zone of "peak temperature") at about the level, or just above the level, at which the streams of heating gas are introduced into the column. A current of cool (i.e., initially unheated) air is forced into the column of pellets from a level adjacent the bottom of the column and countercurrently through the column, to which cool air the pellets give up much of their heat so that this cooling air ultimately becomes heated to a temperature not far below said "maximum" temperature. As the gases move upwardly through the column above said zone of maximum temperature they very rapidly give up much of their heat to the incipiently indurated pellets lying just above the zone of maximum temperature and, eventually, to the green balls lying on the top of the column, very rapidly driving the contained moisture out of the balls. There is a very steep temperature gradient between the zone of maximum temperature and the top surface of the column, which circumstance accounts for the very rapid—sometimes explosively rapid—vaporization of moisture contained in the pellets.

Where this conventional indurating procedure is being practiced on moist green balls whose content of iron is all or mostly in the form of $Fe_3O_4$ a substantial part of the total heat necessary for the induration of the balls is provided by the heat of oxidation of the $Fe_3O_4$. This, of course, is not a feature in indurating green balls the iron content of which is all or mostly in the form of $Fe_2O_3$: in such event, it is necessary to provide a great deal more heat in the form of heating gas in order to secure comparably acceptable induration.

The above-described indurating process, while concededly feasible, is not "ideal" and does have certain disadvantageous aspects. Firstly (and perhaps most importantly), in the described process the rate of heating the moist green balls, in the shaft-type furnace, from substantially room temperature (e.g., about 60° F.) to above the boiling point of water and upward to the first signs of incipient induration (e.g., when the balls have reached a temperature of from about 600° to about 800° F.) is a period wherein the balls exhibit their greatest fragility. Overly fast heating during this period frequently causes the balls to exfoliate and occasioanlly to burst, making for undesired chips and fines in the final product. Under other conditions of operation, a different but possibly more undesirable phenomenon occurs, namely, the condensation of water from hot exhaust gases, saturated with water vapor, on the surfaces of relatively "cold" green balls freshly charged onto the top of the pellets column: such condensed water promotes the formation of gross aggregations or "chunks" or grape-like clusters of mutually adherent balls which persist as such during their movement through the zone of maximum temperature and below, and which cause very serious disruption of the orderly descent of the column as a whole. Such chunks make it necessary to equip the conventional shaft-type indurating furnace with relatively very expensive chunk-breaking equipment (see, for instance, U.S. Patent No. 2,884,237) in order mechanically to sever the rock-like chunks into fragments too small in size to block the gravitational descent of the pellets column. The presence of such chunks in the final product depreciates the value of the latter.

Moreover, overly fast heating of the dried pellets to a temperature of 1000°–2000° F. tends to set up thermal stresses within the pellets—due to too great a temperature gradient from the surface to core—which stresses result in incipient internal cracks. This phenomenon, together with the above-described drying problem, becomes increasingly critical as the size of the pellet is increased, e.g., from, say, one-half inch to one inch or thereabouts in diameter. It is for these reasons that current commercially practiced indurating processes are incapable of making good strong pellets of a size larger than approximately one-half inch.

Study of the problem of indurating green balls of finely divided ore material (e.g., concentrates) has emphasized the desirability of effecting each of the steps of the entire process under those conditions (e.g., temperature; time; mode of handling) which are optimum for that particular step, which conditions may not be optimum for some other step of the over-all process. Out of this finding the process of the present invention materialized.

*Processing magnetic concentrate*

In broad aspect the process, as applied to balls formed from a concentrate consisting wholly or largely of a magnetic oxidic compound of iron, e.g., magnetite may be outlined as follows:

(1) The initially moist green balls are dried and pre-heated to a temperature of about 500°–600° F. under drying conditions which are controlled to avoid cracking and to avoid exfoliation of the balls. Preferably, the drying and pre-heating operation is effected in a simple, conveyor-type, updraft-downdraft furnace of relatively inexpensive mild steel construction, and the thermal requirements are, or may be, supplied by the spent hot wind from step "(2)" following:

It would not be desirable to oxidize any appreciable amount of the magnetite in this step, because the heat of oxidation of magnetite can be more effectively used to aid in final induration at high temperature. Because the rate of oxidation of magnetite becomes appreciable at a temperature of 650–700° F., it is inadvisable to allow the temperature of the pellets undergoing this drying-preheating treatment to exceed about 600–650° F. Preheating to 500–600° F. confers on the magnetite pellets sufficient early strength to withstand the mechanical transfer of the pellets from the conveyor-dryer to a subsequent piece of equipment. In general, a compressive strength of 10–20 pounds on the individual pellets is necessary at this stage. It should be apparent that if the furnace atmosphere during this drying-preheating treatment is substantially devoid of free oxygen, the 600–650° F. temperature can be exceeded, even to the extent of accomplishing some pre-induration. This can be economically accomplished by recycling the drying-preheating gas in a closed circuit so as not to add oxygen (air) thereto.

(2) The dried and preheated balls are transferred, without material cooling, to the hearth of a rotary hearth turntable pre-indurating furnace whereon the balls are heated to a predetermined pre-indurating temperature at a rate sufficiently slow to avoid substantial setting up of adverse thermal stresses within the incipiently indurated objects hereinafter to be styled "pellets" as opposed to the initially unheated moist "green" balls. In this preindurating step the pellets are disposed on the hearth in the form of a shallow bed, essentially one to two layers deep. The thermal requirements for this operation are or may be provided (a) in part by spent hot wind from step "(3)" following and (b) in part by burning a fluid fuel, e.g., a heavy oil or a fuel gas, in said spent hot wind from step "(3)" in an amount to maintain a predetermined final pellet pre-indurating temperature. In this operation the heating of the pellets is essentially radiant heating.

The function of the rotary hearth furnace is to "set the stage" for desired final induration of the dried pellets in a shaft-type indurating furnace. One criterion is to add sufficient sensible heat to the dried and preheated pellets commensurate with the internal fuel in the pellets, in the form of magnetite, in order to effect peak temperature type induration in a shaft-type furnace as hereinafter described under step "(3)." Thus, with an iron ore concentrate the iron oxide content of which is substantially all in the form of magnetite, heating to 1000°–1200° F. in the rotary furnace provides adequate sensible heat in the pellets to develop desired peak temperature induration in the shaft furnace. In the case of a concentrate the iron oxide content of which is about half magnetite and half hematite, heating to a temperature of 1800–2000° F. in the rotary furnace provides the necessary sensible heat in keeping with the lower magnetite fuel value of the pellets.

A further criterion of pre-induration is to confer to the pellets sufficient mechanical strength to withstand transfer from the hearth furnace to the stockline of a shaft-type indurating furnace. Various concentrates require different pre-indurating temperatures for providing such mechanical strength. In some cases it may be desirable to deliberately oxidize a portion of the initial magnetite content at this stage, in order to attain a desired combination of sensible heat content with residual magnetite fuel content in the pellets going to the final shaft-type indurating step.

The time cycle in this pre-indurating furnace is a matter of a few minutes. It has been found experimentally that in the case of one-half inch diameter pellets, the time cycle for pre-induration on the rotary hearth should be no less than 1.5 to 2.0 minutes in order to avoid damage through thermal stress, while in the case of one inch pellets the time cycle for this step should be no less than 3–4 minutes.

(3) The pre-indurated pellets are transferred from the hearth of the pre-indurating furnace to the stockline of a gravitationally descending column of pellets in a shaft-type indurating-cooling chamber wherein they are further heated to some predetermined "peak" temperature—e.g., a temperature of the order of 2200–2500° F., depending on the nature of the starting material—and thereafter are cooled to some predetermined lower temperature preferably from about 200° to about 300° F., at which it is suitable to discharge the indurated and cooled pellets from the shaft furnace.

Counter to the downward movement of the pellets through the shaft-type furnace a current of "cold" (i.e., initially substantially unheated) air is forced into the bottom region of the column of pellets and upwardly through the same. The amount of air so introduced preferably (although not necessarily) is adjusted to have a thermal capacity substantially equal to that of the descending pellets, in order to effect optimum counterflow air-to-pellet heat exchange conditions. In their descent from the "peak temperature" zone the indurated pellets are progressively cooled to some predetermined discharge temperature, e.g., 200–300° F., whilst the initially "cold" air is correspondingly progressively heated, by heat-exchange with the pellets, to about the indurating temperature. The zone of "peak temperature" lies near the stockpile of the pellets column. This "peak induration temperature," which desirably is controlled within the range of from about 2200–2500° F., accrues from the sum of (a) the B.t.u.'s which had been imparted as sensible heat to the pellets in the pre-induration operation plus (b) the B.t.u.'s liberated as heat of oxidation in the oxidation of the magnetite content of the pellets to hematite (normally, about 200 B.t.u.'s per pound of magnetite oxidized to hematite). To offset loss of heat at the shaft walls in the induration region, it may be desirable to utilize a series of small, excess air, "pilot" burners—adapted to burn natural gas, propane, butane or a similar gaseous fuel, arranged to fire into small individual wall ports in the walls of the shaft furnace at an elevation just below the nominal level of the induration zone. These pilot burners would normally contribute about 10,000–20,000 B.t.u.'s per long ton of the pellets, depending on the wall construction.

While in the foregoing general statement it has been suggested that the thermal requirements of the drying-preheating operation (step "(1)") are or may be supplied by the spent hot wind from the succeeding pre-indurating step "(2)," while all of the hot gas exiting from the shaft-type furnace (step "(3)") may be passed to the rotary hearth furnace wherein the pre-indurating step is carried out, it should be pointed out that other dispositions of the hot gases are feasible. Thus in some cases it is technologically desirable (a) to divert the shaft air directly to the dryer and (b) to introduce cold air to the burners in the rotary hearth furnace. A third method (found by pilot plant experience to be quite feasible) consists in passing a part of the shaft air directly to the rotary hearth furnace whilst the remainder of the shaft air is diverted to the dryer, and introducing cold air to the burners in the rotary hearth furnace which mixes with the hot air entering this furnace directly from the shaft furnace. In other large scale operations we arranged to have most of the shaft air go directly to the dryer, with part of the shaft air being piped to hot air burners on the rotary hearth furnace, as distinguished from having the hot air—as such—enter the furnace and using cold air burners.

Regarding the occurrence—and, if so, the extent—of oxidation of magnetite in the pellets during the pre-induration step, the following observations are pertinent.

Typical magnetite concentrates, as produced today commercially in various parts of the world, often contain from 5% to 25% of the contained iron oxide as hematite. This hematite content of course lowers the potential magnetite fuel value of the concentrate. In a situation wherein a straight magnetite concentrate is being processed, we prefer to maintain the atmosphere in the rotary hearth furnace on the oxidizing side; however, in the case of a concentrate having a noticeable amount of hematite, we maintain the atmosphere in the rotary hearth furnace either neutral or slightly on the reducing side in order actually to do some magnetic roasting simultaneously with the pre-induration of the pellets. Our tests indicate that a considerable amount of magnetic roasting can be effected in a period of a few minutes, while the pellets are being heated to a temperature of 1200 to 2000° F. on the rotary hearth.

In some commercial operations, the hematite content may be as low as 1% for a week or so and then go as high as 10 to 15% the following week, as the mining operation is changed in the pit. One of the outstanding features of flexibility of our new oxide pellet process, is that by very simple manipulation we can change the atmosphere in the rotary hearth furnace from oxidizing to neutral to slightly reducing, thereby effecting control over how much oxidation of magnetite we do in the rotary, or of how much magnetic roasting of the hematite content to magnetite we do in the rotary. This control enables us to establish and maintain a desired internal fuel value in the pellets which are charged into the shaft furnace along with independent control of the amount of their sensible heat. We have operated with a reducing atmosphere as well as with an oxidizing atmosphere in the rotary hearth furnace, and the only important difference is that the peak temperature may tend to become excessively high if no pre-oxidation of a high magnetite concentrate occurs in the rotary hearth furnace. It is expected that in a start-up operation, we will deliberately hold the atmosphere neutral in the rotary hearth furnace, in order to preserve the magnetite for the shaft furnace operation, but after we get into operation we will deliberately pre-oxidize as much as 25 to 50% of the magnetite in the rotary hearth furnace in order to prevent the peak temperature in the shaft furnace from becoming too high.

Where it is desired to oxidize a portion of the magnetite in the rotary hearth pre-indurating furnace a substantial portion of the shaft air preferably is diverted through the rotary hearth furnace in order to maintain a free oxygen content in its atmosphere. Where oxidation is to be avoided at this stage, the amount of shaft air which enters the rotary hearth furnace is restricted substantially to that amount required to combust the liquid or gaseous fuel introduced into the rotary hearth furnace whereby an atmosphere non-oxidizing to magnetite is maintained.

*Apparatus requirements*

As was mentioned hereinabove, step "(1)" advantageously may be practiced in a conventional horizontal conveyor-type, updraft-downdraft furnace of relatively inexpensive construction, and the green balls may be delivered to and laid down in the furnace by known or conventional conveyor-feeder means such as those used in connection with traveling grate-type pelletizing machines.

For carrying out step "(2)" of the process there may be employed a rotary hearth furnace of known design such, for instance, as that disclosed and illustrated in, for example, U.S. Patent No. 2,296,791 to Kenner et al.

This furnace may or may not be "sectionalized" to provide a plurality of "compartments" in which different atmospheres and/or temperatures can be maintained: in any event, the important feature is that the heating gases and/or wind ought to be caused to flow generally counter to the rotation of the hearth in order to provide maximum thermal efficiency as well as a reasonably linear heating rate of the pellets which are put on to the hearth. Desirably the walls and curved roof of the annular space within the furnace are lined with suitable high-temperature refractory, and likewise the hearth is surfaced with a suitable refractory layer, e.g., a cast refractory in the fireclay family.

While the heretofore-employed shaft-type indurating furnaces have been rectangular in cross-section and of very expensive construction, the shaft-type furnace used in the present process can be the very much less expensive simple cylindrical furnace. Because the pellets charged to this latter furnace already have undergone significant hardening, they can be transferred from the rotary hearth furnace to the shaft furnace by means of a simple scraper mechanism cooperating with a sloping refractory chute, as opposed to the relatively very expensive loading apparatus found necessary for laying down green balls on the stockline of a column of pellets occupying a conventional shaft-type indurating furnace. In this connection, it is to be noted that while sliding the hot pre-indurated pellets into the shaft furnace may, and ordinarily does, result in establishing and maintaining an inclined (as opposed to horizontal) stockline, this circumstance offers no obstacle to the carrying out of a desirably uniform induration of the pellets.

It is a further characteristic that the simple shaft-type indurating-cooling furnace operable in the present relation requires no expensive and troublesome "chunk breaker" in order to maintain an even descent of the pellets column, because the column is devoid of the aforesaid "chunks."

*The gas current*

The course of the gases in this process is generally counter to the movement of the pellets. The cooling air is introduced adjacent the bottom of the indurating-cooling furnace and is heated in passing upwardly therethrough. The resulting hot air leaves the shaft at a temperature of from about 1600° to about 2200° F., (depending in part on the temperature of the pellets entering the shaft furnace from the rotary), and passes to the rotary hearth furnace and/or the drying-preheating furnace at the latter temperature. The rotary hearth surface may be maintained at from about 1200° to about 2200° F., by the burning of a suitable fluid fuel (e.g., fuel oil or a fuel gas) in a portion of the hot air from the shaft furnace, as described above.

The heating gas exiting from the rotary hearth furnace generally is at a temperature of from about 1000° to about 1200° F. Because it is inadvisable to contact green balls with heating gas at this relatively high temperature, we "dilute" the heating gas with atmospheric air to yield a heating gas mixture for the drying-preheating furnace at a temperature level of from about 600° to about 800° F. Likewise any shaft air passing directly to the drying-preheating furnace is similarly diluted. In traversing the charge of green balls (in the furnace just referred to) the heating gas gives up most of its heat, exiting to atmosphere at a temperature of from about 200° to about 300° F.

Before leaving this phase of the disclosure we note that control over the amount of residual "internal fuel" in the form of magnetite in the pellets prior to the shaft furnace operation is an important feature of this invention. The "peak temperature" attained by the pellets while resident in the shaft furnace is influenced not only by the amount of such "internal fuel" in the pellets charged to the shaft but also by the amount of sensible heat put into the pellets while in the pre-indurating furnace. Each of these variables is independently controllable, by the atmosphere composition within the rotary hearth furnace as well as by the temperature at which that furnace is maintained.

*The conveyor type dryer*

The conveyor type dryer serves two principal process functions:

(1) To dry the green balls without exfoliation and without excessive water reflux clustering, and (2) To heat-harden the balls for transfer to the rotary hearth furnace.

The thermal requirement for drying the heat hardening is satisfied principally from the sensible heat in the spent hot wind leaving the shaft furnace and leaving the rotary hearth furnace. Cold air is used to temper the hot wind before the latter is utilized in the dryer, to avoid any appreciable oxidation of magnetite. Auxiliary fuel will be utilized in the dryer circuit only when necessary to maintain control during normal operation and to enable the dryer to function independently of the shaft furnace and rotary hearth furnace during startup.

The nominal bed depth in the dryer is, or may be, approximately 8–16 inches; the first two-thirds preferably is updraft and the final one-third is downdraft.

Rotary hearth pre-indurating furnace

The pre-indurating step in the rotary hearth furnace involves the following process requirements:

(1) Imparting sufficient strength to the pellets to withstand transfer to the shaft furnace;

(2) Adding sufficient sensible heat to the pellets to insure ignition of their magnetite content in the shaft furnace and to insure a stable "peak" indurating temperature-condition in the shaft furnace;

(3) Pre-indurating the pellets at a controlled rate to minimize internal thermal stresses; and (4) Utilizing the pre-indurating operation for effecting either (a) a pre-determined extent of oxidation of the magnetite or (b) a pre-determined amount of magnetic roasting of hematite contained in the pellets, prior to pellet transfer to the shaft furnace.

In the rotary hearth furnace, the furnace temperature and the gas composition in the furnace atmosphere desirably are independently controlled. To this end, fuel gas may be burned in the combustion zone of the rotary hearth surface, to maintain the desired combustion zone temperature which governs the pellet pre-indurated temperature. Spent hot wind from the shaft furnace, which may contain from about 17% to about 18% free oxygen, preferably is split two ways:

(1) A portion is introduced into the combustion zone of the rotary furnace, either directly or through hot air burners, and (2) A portion is diverted directly to the dryer.

The portion that is introduced into the rotary furnace serves as the principal source of combustion air for the fuel gas burned in the rotary furnace. The resultant gases flow through the rotary furnace counter to the hearth rotation and are flued adjacent the region where the pellets are charged onto the hearth. These flued gases then desirably are utilized in the dryer. The split of hot wind leaving the shaft furnace is controlled to maintain the desired level of free oxygen in the combustion zone of the rotary furnace. The furnace atmosphere in the combustion zone (or, zones) of the rotary hearth furnace may be controlled so as to contain a pre-determined content of free oxygen, or to be neutral, or to contain a small amount (say 3–4%) of combustibles having a net reducing effect in order to carry out a flash magnetic roasting (in case the concentrate contains an appreciable amount of hematite).

It is preferred that pellets be charged essentially one to two layers deep onto the rotary hearth of the pre-indurating furnace. The rotary hearth furnace is or may be made to be capable of automatically accommodating a feed rate variation of plus or minuss 10% from a nominal set rate, to eliminate the need for surge storage between the dryer and the rotary hearth furnace.

Shaft-type indurating-cooling furnace

In the shaft furnace, the sensible heat which has been put into the pellets in the rotary hearth furnace together with the heat available from oxidation of magnetite fuel, and in conjunction with the wind-to-pellet counterflow heat-exchange situation in the shaft, cause the pellets to reach a "peak" induration temperature of the order of 2200–2500° F.

The control criterion for rate of blow of shaft air, which is introduced at the bottom of the cooling region of the shaft furnace, is the pellet discharge temperature from the shaft. The shaft may, in general, be sized to discharge pellets at a temperature of 200° F. to 300° F., while simultaneously maintaining pellets at "peak" indurating temperature for approximately one (1) hour in the indurating region of the shaft. The rate of blow of air to the shaft furnace is or desirably may be automatically flow-controlled to maintain a pre-determined setting.

The shaft furnace may accommodate a feed rate variation of plus or minus 10% from a nominal set rate.

In one specific embodiment it was found expedient so to scale the main pieces of equipment that one rotary hearth furnace was serviced by one conveyor-type drier, and the rotary hearth furnace in turn serviced four shaft-type indurating furnaces whereby to process approximately 150 long tons of finished (indurated) pellets per hour.

Processing non-magnetic concentrate

The procedure for pelletizing non-magnetic, e.g., hematitic, concentrates and similar finely divided non-magnetic oxidic compounds of iron is substantially the same as the above identified procedure for pelletizing magnetite concentrate, but differs therefrom by the inclusion of one additional step, to wit, the inclusion of coal or other solid carbonaceous fuel in the green balls.

It is a feature of the present invention that the dried, pre-heated and pre-indurated pellets receive the final increment of their "peak" temperature heating, by way of the heat of oxidation of internal fuel, which may be in the form either of magnetite or of solid carbon or of a combination of these fuels. Accordingly, when processing non-magnetic concentrates or fines, a solid fuel, e.g. a powdered coal such as "Pocahontas" or anthracite is added to the concentrate prior to the balling-up operation. The amount of coal required is relatively small. For example, for a straight hematite concentrate only about 20 to about 30 pounds (more or less) of powdered Pocahontas coal, of average quality, per long ton of pellets produced is required.

For a concentrate containing 50 to 60% hematite about 10–15 pounds of coal (per long ton of pellets produced) would be used. The amount of coal added to a hematitic concentrate depends upon whether or not some magnetic roasting is done, by the furnace atmosphere, in the rotary hearth furnace, as previously described.

When coal is added to a concentrate which is high in hematite, the maximum temperature to which the green balls may be preheated in the dryer-preheater is about 600–650° F. to avoid combustion of the coal, which range is substantially the same as that desirable for avoiding oxidation of magnetite. Similarly the rotary hearth furnace can be operated in a manner to oxidize some of the coal or to preserve the coal for combustion in the shaft furnace by adjustment of the furnace atmosphere as described above with reference to processing magnetite. When the coal-containing pellets are heated to a temperature approaching or exceeding 1800° F. on the rotary hearth, some of the coal will react to reduce hematite to artificial magnetite within the pellets. Such artificial magnetite is useful as fuel in the shaft furnace.

In connection with the conveyor-type dryer, one of the functions of which is to heat-harden the green balls for transfer to the rotary hearth furnace, it usually is necessary to add a "dried strength" binder such as bentonite or starch to the hematitic concentrate in order to obtain sufficient hardening in the pre-heating step of the process.

Influence of pellet sizes

Conventionally, by far the greatest volume of indurated pellets of iron ore concentrates are processed with the blast furnace in mind, and currently their diameters generally fall within the range of from about 0.385 to about 0.5 inch. Those pellets have a surface area of from about 70 to about 80 square feet per cubic foot of pellets. For certain purposes large pellets—e.g., pellets having diameters of at least 1.0 inch—are desired. One inch pellets have a surface area of only about 40 square feet per one cubic foot of the pellets. As is known, the heat transfer coefficient (for a given wind mass flow) falls off significantly with increase in the size of the pellets. These two unfavorable factors add together to make it unfeasible to indurate pellets having diameters in excess of about one-half inch on a traveling grate type of pelletizing furnace. The "heat line" in a 12″–18″ bed of one inch pellets would not be a sharp one, and the grate bars would become heated almost as fast as would these large pellets, resulting in excessive grate bar temperatures during the induration.

An advantage of the present pelletizing process is that the drying rate can be properly controlled, and the pre-induration can be conducted under controlled conditions of temperature, time and other variables. The operation of the indurating-cooling chamber (the shaft-type indurating furnace) can be controlled to yield the optimum temperature profile and efficiency of heat transfer and the retention time necessary for substantial grain growth induration due to the large volume of pellets in the shaft furnace. None of the several pieces of equipment used in the over-all procedure is subjected to adverse conditions for the materials of construction involved. Because each of the steps of drying, preheating, pre-indurating, indurating and cooling is carried out in a piece of apparatus best suited therefor:

(a) The process produces high-quality pellets with an unusually good pellet-to-pellet strength uniformity. A 98 tumble already has been realized.

(b) The process lends itself to stop-start conditions, as for scheduled shut downs.

(c) The indurated product includes a minimum of "chips" and "fines."

(d) As noted above, the process is very well adapted to the production of large (one inch, or larger) pellets.

(e) The process produces fully indurated pellets formed from magnetite concentrates with a fuel consumption of 250,000–300,000 B.t.u.'s per long ton of indurated pellets, and from hematite concentrates with a fuel consumption of less than 1,000,000 B.t.u.'s per long ton.

The invention may be further explained on the basis of the accompanying drawing, in which The single figure is a diagrammatic representation, or "flow sheet," of the present process.

The drawing shows the co-operative disposition of three, individually generally conventional, furnaces through which pellets serially pass. The serially first, identified at 2, is a conveyor-type, updraft-downdraft drying pre-heating furnace. 3 represents a rotary-hearth pre-indurating furnace, while 4 represents a shaft-type indurating-cooling furnace. A stream 1a of initially room temperature, initially moist, "green" balls or pellets enters furnace 2 and is carried on a foraminous conveyor through 2 and exits therefrom, in the form of a stream 1b of dried and partially heated pellets. This latter stream is transferred onto the hearth of rotary-hearth indurating furnace 3, and exits from the latter, in the form of a stream 1c of pre-indurated pellets. Stream 1c flows, as by gravity, from furnace 3 to, and onto the stockline of a column of pellets in, shaft-type indurating-cooling furnace 4, from the bottom of which latter a stream 1d of fully indurated pellets is discharged, as final product.

Furnace 4 is provided, adjacent its lower part, with an air inlet means 5. A current 10a of initially substantially unheated air, in the ratio of from about 0.7 lb. to about 0.8 lb. per pound of finally discharged indurated and cooled pellets, is forced into air inlet means 5 and thence into the pellets column-occupying space of furnace 4. The resulting heat transfer from pellets to air serves to heat the air to a temperature close to but below the level or zone of "peak" temperature of induration which obtains in the upper part of the pellets column in furnace 4. In countercurrently passing through said peak temperature zone the cooling air becomes further heated. In the final part of its passage through the pellets column this highly heated air gives up some of its heat to the topmost pellets freshly introduced as stream 1c, and thence passes as stream 10b to and into rotary hearth furnace 3 and/or stream 10b' to the drying-preheating furnace 2. In furnace 3 the temperature of the air stream is further elevated and thereupon the highly heated stream gives up a large part of its heat to the heat-radiating walls and ceiling of furnace 3, and thence, to pellets being transported through furnace 3 on the rotary hearth of the latter. The resulting warm gas stream, 10c, passes out of furnace 3 and thence—after suitable tempering—to and into the conveyor-type, updraft-downdraft drying-heating furnace 2. The resulting gas stream 10d, largely cooled through heat-exchange with the initially moist green balls in furnace 2, is wasted to atmosphere, at a temperature of from about 200° to about 300° F.

What is claimed is:

1. A process for indurating a material consisting of initially moist green pellets of iron ore concentrates that contain an oxidizable fuel, comprising: drying the pellets, pre-indurating the pellets at a temperature between 1000°–2000° F. to provide sensible heat to the pellets while preserving a substantial portion of the oxidizable fuel, indurating the pellets by passing an oxidizing gas therethrough to oxidize the remaining fuel in the pellets and raise the temperature thereof to at least 2200° F. solely through oxidation of the remaining fuel in the pellets.

2. The process of claim 1 wherein the pellets are heated radiantly during said pre-indurated step.

3. The process of claim 1 in which said fuel consists essentially of magnetite.

4. The process defined in claim 1 in which the iron ore consists essentially of hematite and at least a portion of the fuel consists of a carbonaceous material.

5. The process as defined in claim 1 wherein the amount of oxidizing gases in the atmosphere in said pre-indurating step is controlled, so that less than the major portion of the oxidizable fuel is oxidized.

6. A process for indurating a material consisting of initially moist green pellets of iron ore concentrates that contain an oxidizable fuel, comprising: drying the pellets, pre-indurating the dried pellets at a temperature between 1000°–2000° F. to provide sensible heat to the pellets while preserivng a substantial portion of the fuel, and placing the pre-indurated pellets in a shaft furnace, passing an oxidizing gas therethrough, and indurating by seating to a temperature of at least 2200° F. solely through oxidation of the remaining fuel contained within the pellets.

7. The process of claim 6 wherein said dried pellets are pre-indurated by placing them on the hearth of a rotary hearth furnace.

8. The process of claim 6 in which said fuel consists essentially of magnetite.

9. The process defined in claim 6 in which the iron ore consists essentially of hematite and at least a portion of the fuel consists of a carbonaceous material.

10. The process as defined in claim 6 wherein the amount of oxidizing gases in the atmosphere during pre-induration is controlled so that less than the major portion of the oxidizable fuel is oxidized.

11. A process for indurating pellets containing a high percentage of magnetite, comprising: drying the pellets at a temperature of 500°–600° F., heating the pellets to a temperature between 1000° and 1200° F., and indurating the pellets by passing an oxidizing gas therethrough to oxidize the remaining fuel within the pellets and raise the temperature thereof to at least 2200° F. solely through oxidation of the remaining fuel.

12. The process of claim 11 wherein the pellets when heated between 1000°–1200° F. are in an environment substantially devoid of free oxygen.

13. The process of claim 11 wherein the pellets are heated to a temperature of 1000°–1200° F. by placing them on a rotary hearth one to two layers deep.

References Cited

UNITED STATES PATENTS

| | | | |
|---|---|---|---|
| 2,533,142 | 12/1950 | Royster | 75—5 |
| 2,590,090 | 3/1952 | De Vaney | 75—5 |
| 2,750,273 | 6/1956 | Lellep | 75—3 |
| 2,750,274 | 6/1956 | Lellep | 75—5 |
| 2,758,919 | 8/1956 | De Vaney et al. | 75—5 |
| 2,925,336 | 2/1960 | Stowasser | 75—3 |
| 2,961,411 | 11/1960 | Klugh | 75—4 |

BENJAMIN HENKIN, *Primary Examiner.*